United States Patent [19]

Hoshino

[11] 4,385,845
[45] May 31, 1983

[54] FLYWHEEL APPARATUS FOR STORING ELECTRICAL ENERGY

[75] Inventor: Yoshinobu Hoshino, Kobe, Japan

[73] Assignee: Mitsubishi Denki Kabushiki Kaisha, Hogyo, Japan

[21] Appl. No.: 324,355

[22] PCT Filed: Jun. 30, 1981

[86] PCT No.: PCT/JP81/00149
  § 371 Date: Nov. 17, 1981
  § 102(e) Date: Nov. 17, 1981

[87] PCT Pub. No.: WO82/00322
  PCT Pub. Date: Feb. 4, 1982

[30] Foreign Application Priority Data

Jul. 10, 1980 [JP] Japan ................................. 55-95336

[51] Int. Cl.³ ..................... F16C 32/06; F16C 17/04; F16C 17/08
[52] U.S. Cl. ..................................... 384/123; 384/226; 384/240; 384/305; 384/371; 384/425
[58] Field of Search ............... 384/123, 425, 226, 228, 384/305, 307, 317, 321, 371, 303, 900, 193, 240, 241, 251, 243, 121; 74/572; 416/60, 60 A

[56] References Cited

U.S. PATENT DOCUMENTS

| | | | |
|---|---|---|---|
| 191,390 | 5/1877 | Webber | 384/226 |
| 229,039 | 6/1880 | Geyelin | 384/226 |
| 1,436,265 | 11/1922 | Kingsbury et al. | 384/305 |
| 3,376,083 | 4/1968 | Muijderman | 384/123 |

FOREIGN PATENT DOCUMENTS 52-65805   5/1977   Japan .

Primary Examiner—Stuart S. Levy
Assistant Examiner—Thomas R. Hannon
Attorney, Agent, or Firm—Sughrue, Mion, Zinn, Macpeak & Seas

[57] ABSTRACT

A highly reliable device for stopping the operation of a flywheel apparatus for storing electrical energy in the event of interruption of power supply includes a thrust plate 11 connected to the rotatory part of the apparatus, and having a lower surface defining a thrust bearing surface. A pressure receiving surface 26 facing the lower surface of the thrust plate, and defining a thrust bearing surface is provided with a plurality of radially extending grooves 27 each having at least one sidewall which defines an upwardly inclined land 28 as viewed in the direction of rotation of the rotatory part. Provided below the pressure receiving surface 26 is a cooling fluid passage 33 connected to an electromagnetic valve 35 adapted to open upon interruption of power supply to allow a cooling fluid to flow into the passage 33. The device further includes means for maintaining a hydraulic fluid between the thrust bearing surfaces during interruption of power supply.

2 Claims, 5 Drawing Figures

FLYWHEEL APPARATUS FOR STORING ELECTRICAL ENERGY

TECHNICAL FIELD

This invention relates to a flywheel apparatus for storing electrical energy by converting it to rotatory inertial energy on a flywheel, and releasing the rotatory inertial energy to reconvert it to electrical energy when required. More particularly, it is concerned with means for stopping such a flywheel apparatus upon interruption of power supply.

BACKGROUND ART

Researches have recently been under way for improving the capacity of a flywheel apparatus for storing electrical energy. For this purpose, it is useful to employ a flywheel having a large momentum, and rotating at a high speed. As a result, large flywheels having a weight of several tens of tons to several hundred tons have come to be used. This increase in size of flywheels has, however, given rise to a lot of technical problems. One of them is concerned with a means for stopping the motion of a flywheel when power supply has been interrupted.

FIG. 1 shows by way of example a known flywheel apparatus for storing electrical energy. A motor dynamo 1 for energy conversion functions as a motor when energy is stored, and as a dynamo when energy is released. A flywheel 2 is rotated by the motor dynamo 1 for storing electrical energy by converting it to rotatory inertial energy. The flywheel 2 is connected to the rotor of the motor dynamo 1 by a coupling 3. The rotary shafts of the rotor and the flywheel 2 are rotatably supported by ball-and-roller bearings 4a, 4b and 4c. A thrust bearing device 5 supports the rotary part of the apparatus, including the flywheel 2, and comprises a fixed thrust bearing 5a. A magnetic bearing 6 includes a magnetic coil 7. The flywheel 2, the thrust bearing device 5 and the magnetic bearing 6 are accommodated in a casing 8 having an interior 9 in which a vacuum is maintained for minimizing the windage loss arising from the rotation of the flywheel 2. Seals 10 are provided for the ball-and-roller bearings 4b and 4c to maintain the vacuum in the casing interior 9. The thrust bearing device 5 further includes a thrust plate 11 attached to a lower flywheel shaft 12. The weight of the rotatory part of the apparatus is partially supported by the thrust bearing 5a.

The following is a description of the operation of the known apparatus as hereinabove described. When the apparatus is in normal operation, the majority of the weight of its rotatory part, usually at least about 90%, is supported by the magnetic bearing 6, so that the load on the bearings 4a to 4c may be reduced. The remaining weight of the rotatory part of the apparatus is supported by the thrust plate 11 on which the hydraulic fluid fed through the thrust bearing 5a in the direction of an arrow A exerts a slight hydraulic pressure. The hydraulic fluid present between the thrust bearing 5a and the thrust plate 11 also provides a damping effect on the vertical vibratory motion of the flywheel 2. As an evacuating device not shown maintains the vacuum in the interior 9 of the casing 8, the rotation of the flywheel 2 is hardly affected by any windage loss.

Under normal conditions, the apparatus continues stable operation very satisfactorily. Once the power supply fails, however, electricity ceases to be supplied to the magnetic bearing 6, and a pump provided for feeding a hydraulic fluid through the thrust bearing 5a in the direction of the arrow A, though not shown. The magnetic bearing 6 loses its attractive force, and the supply of the hydraulic fluid to the thrust bearing 5a is interrupted. As a result, the whole weight of the rotatory part of the apparatus bears on the thrust bearing device 5, and the bearings 4a to 4c. The rotatory part is very heavy. For example, the flywheel 2 usually has a weight of several tens of tons to several hundred tons. It is entirely difficult to support by the bearings 4a to 4c. If the weight is to be supported by the thrust bearing device 5, it is necessary to enlarge the thrust bearing 5a and the thrust plate 11 in outside diameter to increase their loading capacity to decrease the mean surface pressure acting thereon. A very large thrust bearing is required. It is difficult to cool the thrust bearing satisfactorily, since the operation of the feed pump stops, and the supply of the cooling fluid is interrupted. There is always a considerably long time before the operation of the apparatus stops completely. It is often difficult to maintain a sufficiently high fluid pressure and a sufficiently large fluid quantity, even if the fluid is supplied by gravity from a separate fluid reservoir.

DISCLOSURE OF THE INVENTION

This invention provides a flywheel apparatus for storing electrical energy, which includes a thrust bearing device comprising a thrust plate connected to the rotatory part of the apparatus, and having a lower thrust bearing surface, and a thrust bearing having an upper thrust bearing surface facing the lower surface of the thrust plate, the thrust bearing surface of the thrust bearing being provided with a plurality of radially extending grooves each having at least one sidewall defining an upwardly inclined land as viewed in the direction of rotation of the rotatory part, the thrust bearing being provided below its thrust bearing surface with a cooling fluid passage connected to an electromagnetic valve adapted to open upon interruption of power supply to introduce a cooling fluid into the cooling fluid passage, means being provided for retaining a hydraulic fluid on the thrust bearing surfaces during the interruption of power supply.

According to this invention, it is possible to maintain the oil films on the thrust bearing surfaces, and the proper function of the thrust bearing even after interruption of power supply until the rotation of the apparatus is completely stopped, since the weight of the rotatory part of the apparatus is supported by the dynamic pressure created by the rotation of the thrust plate, the thrust bearing temperature is kept from rising above a prescribed level by the cooling fluid supplied upon interruption of power supply, and an additional supply of lubricant is provided by a hydraulic port or the like. Therefore, the normal operation of the flywheel is ensured even after interruption of power supply, and the motor dynamo functions as a dynamo after a prescribed length of time to thereby stop the operation of the apparatus with a high degree of reliability.

BEST MODE FOR CARRYING OUT THE INVENTION

Figure 2:
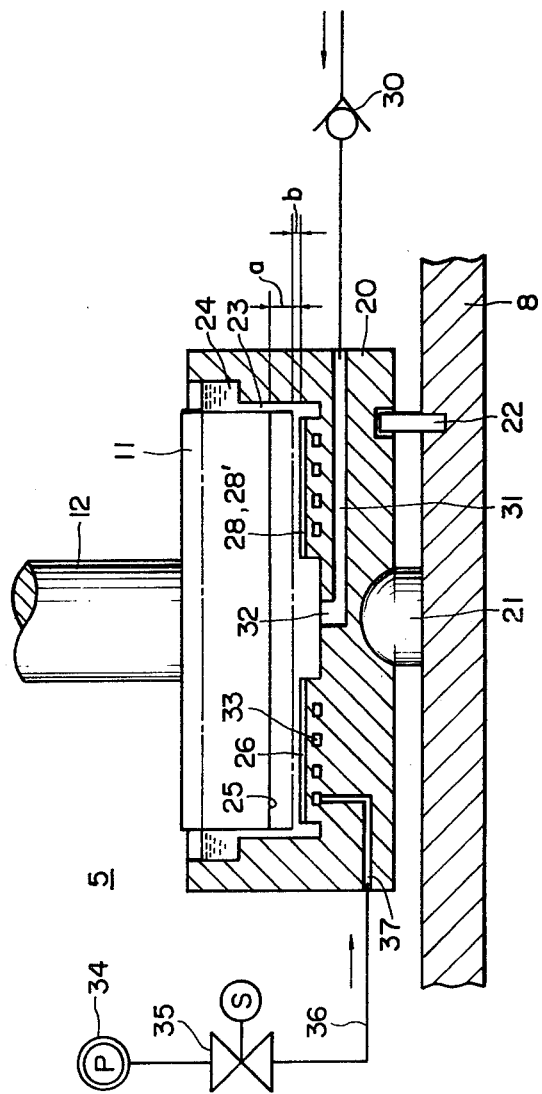
FIG. 2 is a longitudinal sectional view showing a thrust bearing device in a flywheel apparatus for storing electrical energy according to this invention.
Figure 3:
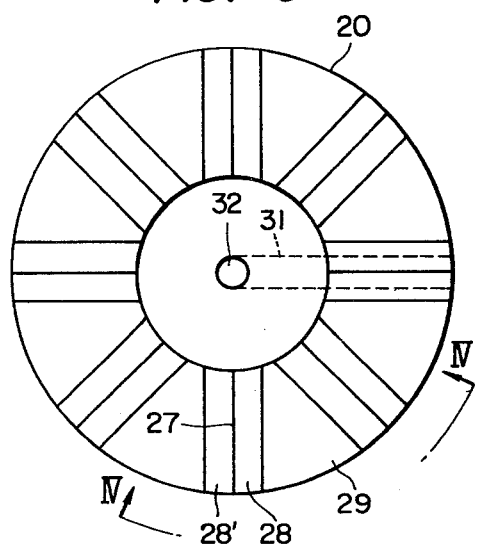
FIG. 3 is a top plan view of the thrust bearing surface of a thrust bearing in the device shown in FIG. 2.
Figure 4:
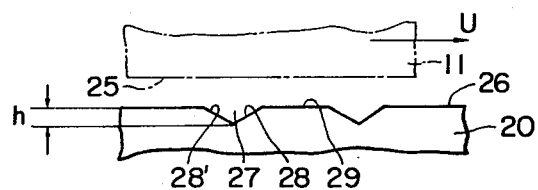
FIG. 4 is a view of the thrust bearing taken along the line IV—IV of FIG. 3.

The invention will now be described with reference to FIGS. 2 to 4 of the drawings showing a preferred form of the thrust bearing device.

The thrust bearing device 5 comprises a thrust plate 11, and a thrust bearing 20. The thrust bearing 20 is fixed to a casing 8 by a pivot 21 and a pin 22. The thrust plate 11 is received in the thrust bearing 20, and a clearance 23 is present therebetween. A hydraulic port 24 is formed above the clearance 23. The thrust plate 11 has a lower surface 25 defining a thrust bearing surface. The thrust bearing 20 has a pressure receiving surface 26 facing the lower surface 25 of the thrust plate 11. The pressure receiving surface 26 is formed with a plurality of radially extending grooves 27 usually having a depth h of 30 to 50 microns. Each groove 27 is defined by inclined lands 28 and 28' as shown in FIGS. 3 and 4, and the inclined land 28 is upwardly inclined as viewed in the direction of rotation of the rotary part of the apparatus, and hence of the thrust plate 11 as shown by an arrow U in FIG. 4. Every two adjoining grooves 27 define a flat land 29 therebetween. The thrust bearing 20 has a hydraulic fluid passage 31 terminating in an outlet opening 32 in the center of the thrust bearing 20. A hydraulic fluid is supplied into the space between the lower surface 25 of the thrust plate 11 and the pressure receiving surface 26 of the thrust bearing 20, the clearance 23 and the hydraulic port 24 by a feed pump not shown through a check valve 30 and the passage 31. The thrust bearing 20 is also provided with a cooling fluid passage 33 below the pressure receiving surface 26, and an inlet passage 37 leading to the cooling fluid passage 33. A source of cooling fluid 34, and an electromagnetic valve 35, which is adapted to open upon interruption of power supply, are connected to the inlet passage 37 by a conduit 36 to introduce a cooling fluid into the cooling fluid passage 33 upon interruption of power supply.

Figure 1:
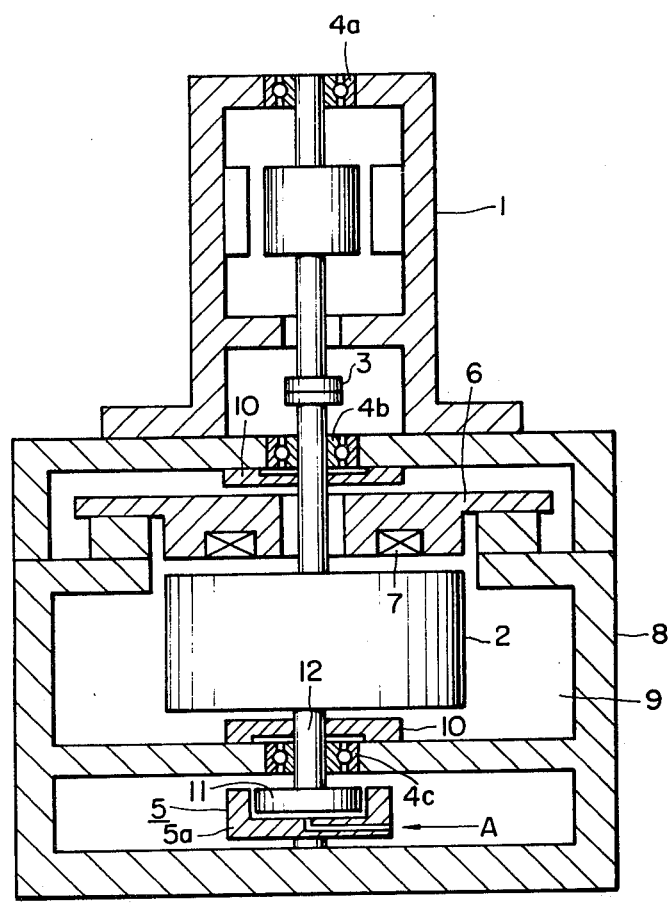
FIG. 1 is a longitudinal sectional view of a known flywheel apparatus for storing electrical energy.

In other respects, the apparatus of this invention is identical to the known apparatus shown in FIG. 1, and no further description would be required.

The following is a description of the operation of the apparatus of this invention constructed as hereinabove described.

During operation, the spacing between the thrust plate 11 and the thrust bearing 20 is maintained as indicated at a by the hydraulic fluid supplied thereinto from the feed pump not shown through the check valve 30 and the passage 31, and the dynamic pressure created by the rotation of the thrust plate 11. Any hydraulic fluid overflowing the clearance 23 and the hydraulic port 24 is discharged. Some static pressure is created on the lower surface of the thrust plate 11 to support a portion of the weight of the rotatory part of the apparatus, and provide a sufficient damping effect on the vertical vibratory motion of the thrust plate 11, and hence of the rotary part of the apparatus.

Upon interruption of power supply, both the magnetic bearing 6 and the feed pump stop operation. The magnetic bearing 6 loses its attractive force, and the feed pump ceases to supply any hydraulic fluid. The thrust plate 11 moves down until the spacing between the thrust plate 11 and the thrust bearing 20 is reduced as indicated at b. The hydraulic fluid, however, still remains in the spacing b, the clearance 23 and the hydraulic port 24, since the check valve 30 prevents any back flow of the hydraulic fluid in the passage 31. The remaining fluid maintains the fluid film between the lower surface 25 of the thrust plate 11 and the pressure receiving surface 26 of the thrust bearing 20.

The rotatory part of the apparatus continues rotation by inertia for a certain length of time after interruption of power supply, but the discontinuation of fluid circulation substantially stops the release of heat from the thrust bearing device. There is, thus, every likelihood that seizure may occur between the lower surface 25 of the thrust plate 11 and the pressure receiving surface 26 of the thrust bearing 20. Since the thrust bearing device is required to keep working until the rotation of the rotatory part is completely stopped, the electromagnetic valve 35 opens upon interruption of power supply to allow the cooling fluid to flow from its source 34 into the cooling fluid passage 33 through the valve 35, the conduit 36 and the inlet passage 37 to cool the pressure receiving surface 26 of the thrust bearing 20 and maintain the bearing temperature at a prescribed level, whereby the fluid film is maintained in the thrust bearing device.

Figure 5:
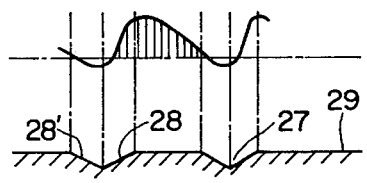
FIG. 5 is a diagram showing the hydraulic pressure prevailing during operation between the thrust bearing and the thrust plate in the device shown in FIG. 4.

Due to the inertial rotation of the rotatory part, and hence of the thrust plate 11 after the interruption of power supply, the mutually adjoining inclined lands 28 and 28', and flat lands 29 of the thrust bearing 20 produce a wedge effect which creates a dynamic fluid pressure having a distribution as shown in FIG. 5. This dynamic pressure supports the weight of the rotatory part, and prevents the lower surface 25 of the thrust plate 11 from contacting the pressure receiving surface 26 of the thrust bearing 20, whereby the fluid film is maintained therebetween. The seizure between the thrust plate 11 and the thrust bearing 20 is prevented by the cooling fluid which keeps the temperature of the pressure receiving surface 26 from rising above a prescribed level, and the additional hydraulic fluid supply provided by the hydraulic port 24, or the like.

INDUSTRIAL APPLICABILITY

This invention is not only applicable to the thrust bearing device for a flywheel, but is also useful for application to a thrust bearing device for any large, vertically mounted rotatory machine having a large amount of rotatory inertial energy.

I claim:

1. A flywheel apparatus for storing electrical energy, said apparatus including a thrust bearing device which comprises a thrust plate connected to the rotatory part of said apparatus, and having a lower surface defining a thrust bearing surface, and a thrust bearing having a pressure receiving surface facing said lower surface of said thrust plate, and defining a thrust bearing surface, said pressure receiving surface being provided with a plurality of radially extending grooves, each of said grooves having at least one sidewall defining an upwardly inclined land as viewed in the direction of rotation of said rotatory part, said thrust bearing being further provided below said pressure receiving surface with a cooling fluid passage connected to an electromagnetic valve means for opening said electromagnetic valve upon interruption of power supply to allow a cooling fluid to flow into said passage, means being provided for maintaining a hydraulic fluid between said thrust bearing surfaces during interruption of power supply.

2. A flywheel apparatus for storing electrical energy as set forth in claim 1, wherein said means for maintaining a hydraulic fluid between said thrust bearing surfaces during interruption of power supply comprises a clearance between the outer periphery of said thrust plate and the inner periphery of said thrust bearing, a hydraulic port provided above said clearance, and a check valve provided upstream of an inlet to a hydraulic fluid passage opening in said pressure receiving surface.

* * * * *